Aug. 26, 1969  R. J. KRAUSHAAR  3,463,920
CRYOGENIC FUEL GAUGING APPARATUS UTILIZING
NEUTRON ABSORPTION TECHNIQUES
Filed Aug. 31, 1965  2 Sheets-Sheet 1
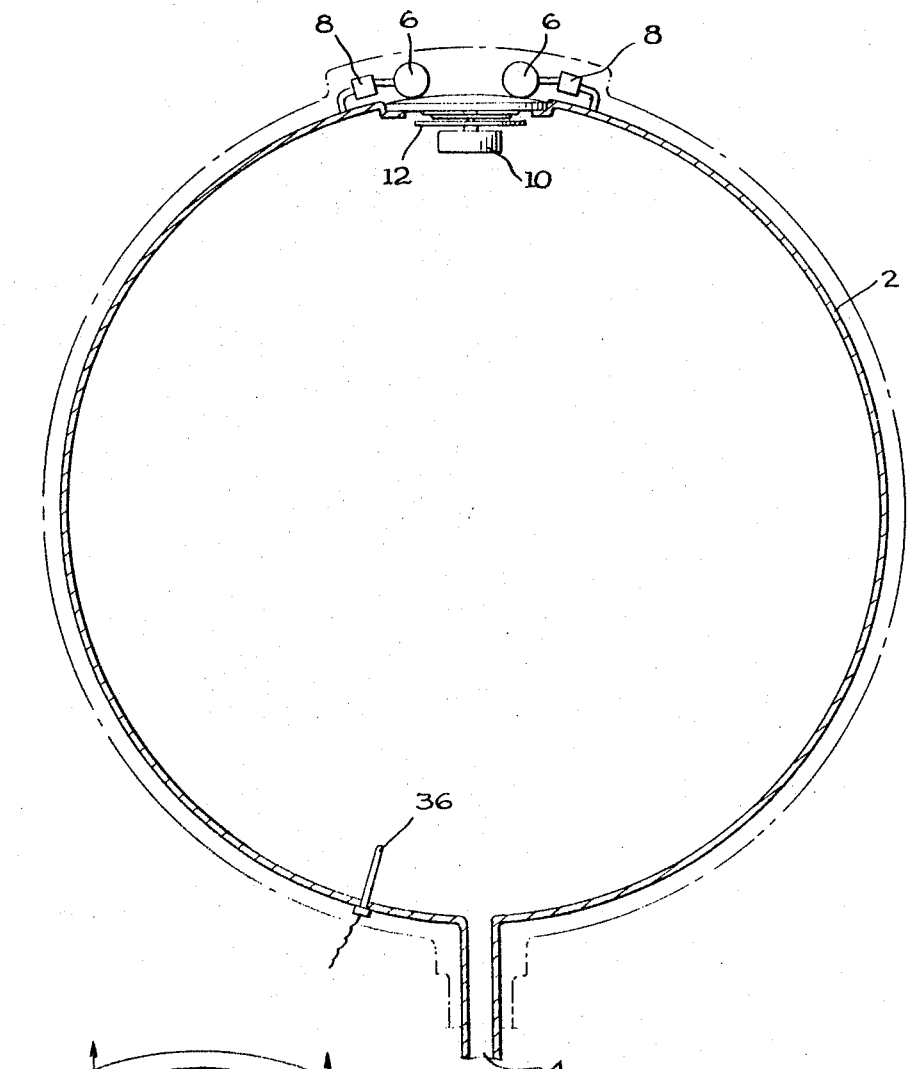
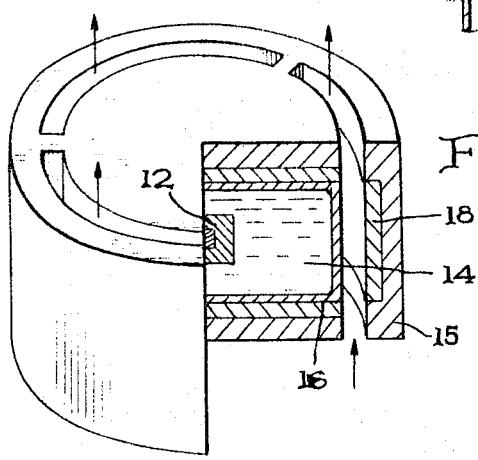
INVENTOR
ROBERT J. KRAUSHAAR
BY
ATTORNEY

INVENTOR
ROBERT J. KRAUSHAAR

United States Patent Office 3,463,920
Patented Aug. 26, 1969

3,463,920
CRYOGENIC FUEL GAUGING APPARATUS UTILIZING NEUTRON ABSORPTION TECHNIQUES
Robert J. Kraushaar, Tenafly, N.J., assignor to Simmonds Precision Products, Inc., Tarrytown, N.Y., a corporation of New York
Filed Aug. 31, 1965, Ser. No. 483,996
Int. Cl. G01n 23/12
U.S. Cl. 250—43.5                                3 Claims

ABSTRACT OF THE DISCLOSURE

A fuel gauging system for measuring the quantity of cryogenic propellant in a tank utilizing a trace material of $Helium^3$ in the pressurizing gas normally associated with the propellant in a closed tank. A density measurement is made of the trace gas by measuring the attenuation of a neutron flux passing through a gap of fixed length located within the tank. For this purpose there is provided a thermal neutron source and two neutron detectors and an absorption chamber.

---

This invention relates to fuel gauging which is compatible with cryogenic high-energy propellants in space environment, and more particularly to a fuel gauging system for determining propellant mass by measuring the density of a known amount of trace gas injected into the fuel tank.

The system proposed by this invention provides a method of measuring propellant quantities independent of fluid orientation and distribution within the fuel container. Measurement is based on the injection into an enlarged gas space within the fuel container of an accurately pre-measured quantity of a trace gas whose density can be selectively measured at all times. In general certain conditions must be met in measuring cryogenic fluids in zero gravity environment. For example, the trace gas used must not condense within the cryogenic tank and further the trace gas density must be capable of selective measurement in the presence of propellant vapors and pressurizing gas mixtures. The choice of trace gas therefore, depends on several factors including the ability to remain gaseous at the severe temperatures encountered. Further it must possess a measurable characteristic not shared by the expulsion gas or the fuel vapor within the tank and this characteristic should be easily measurable.

Accordingly, it is the object of this invention to provide a fuel gauging technique employing a trace gas detection system for use with crogenic high-energy propellants in a gravity or space environment.

It is another object of this invention to provide a fluid gauging system for measuring propellant quantities independent of fluid orientation and distribution.

Yet another object of this invention is to provide a fuel gauging system employing a detection element primarily sensitive to thermal neutrons and located inside a fuel tank.

Still another object of this invention is to provide a trace gas detection device for fuel gauging wherein the trace gas is characterized by an easily measurable quality which will insure accurate selective measurement in a space environment.

In accordance with the principles of this invention a fuel gauging system is provided for a propellant tank of simple continuous shape such as a sphere, cylinder, ellipsoid, or combinations of these shapes. The system utilizes a trace material in the pressurizing gas normally associated with a high-energy propellant in a closed tank. The boiling temperature of hydrogen, a well known high-energy propellant, is lower than that of any other substance except helium. This condition requires that the trace gas be restricted to a helium isotope which can be detected in the regular $Helium^4$ used for pressurization. Further a characteristic unique to $Helium^3$ relative to $Helium^4$, the hydrogen isotopes and fluorine is the relative large size of its thermal neutron cross section. This large cross section will insure an accurate selective measurement of its density by neutron absorption techniques. To make the trace gas density measurement it is necessary to pass the ullage gas in the tank through a gap of fixed length and measure the attenuation of a neutron flux passing through this gap. Making a measurement of this type in the Van Allen environment might on first appearances present problems since it is reasonable to assume that space radiation will affect the measurement of a neutron flux. However, this is not the case in the system employing the principles of this invention because the detection element is primarily sensitive to thermal neutrons. Also it is conceivable that high energy protons could provide a spurious signal. The pulse height, however, would be at least two orders of magnitude greater than those due to thermal neutrons. These proton counts therefore will be completely eliminated by pulse height discrimination. As an additional safeguard for responsive operability in the Van Allen environment, the detection element is mounted inside the tank and may be completely shielded from space radiation. The basic measurement device consists of a thermal neutron source, two neutron detectors, and an absorption chamber. The primary design parameter for such a device is the count ratio which determines the statistical accuracy and finite time interval associated with each measurement.

Other objects and advantages will become apparent from the following description taken in conjunction with the accompanying drawings and which:

FIG. 1 is a plan view showing the detector device according to this invention located inside a closed fuel container.

FIG. 2 is an elevational view broken away in part of the detection device.

Figure 3:
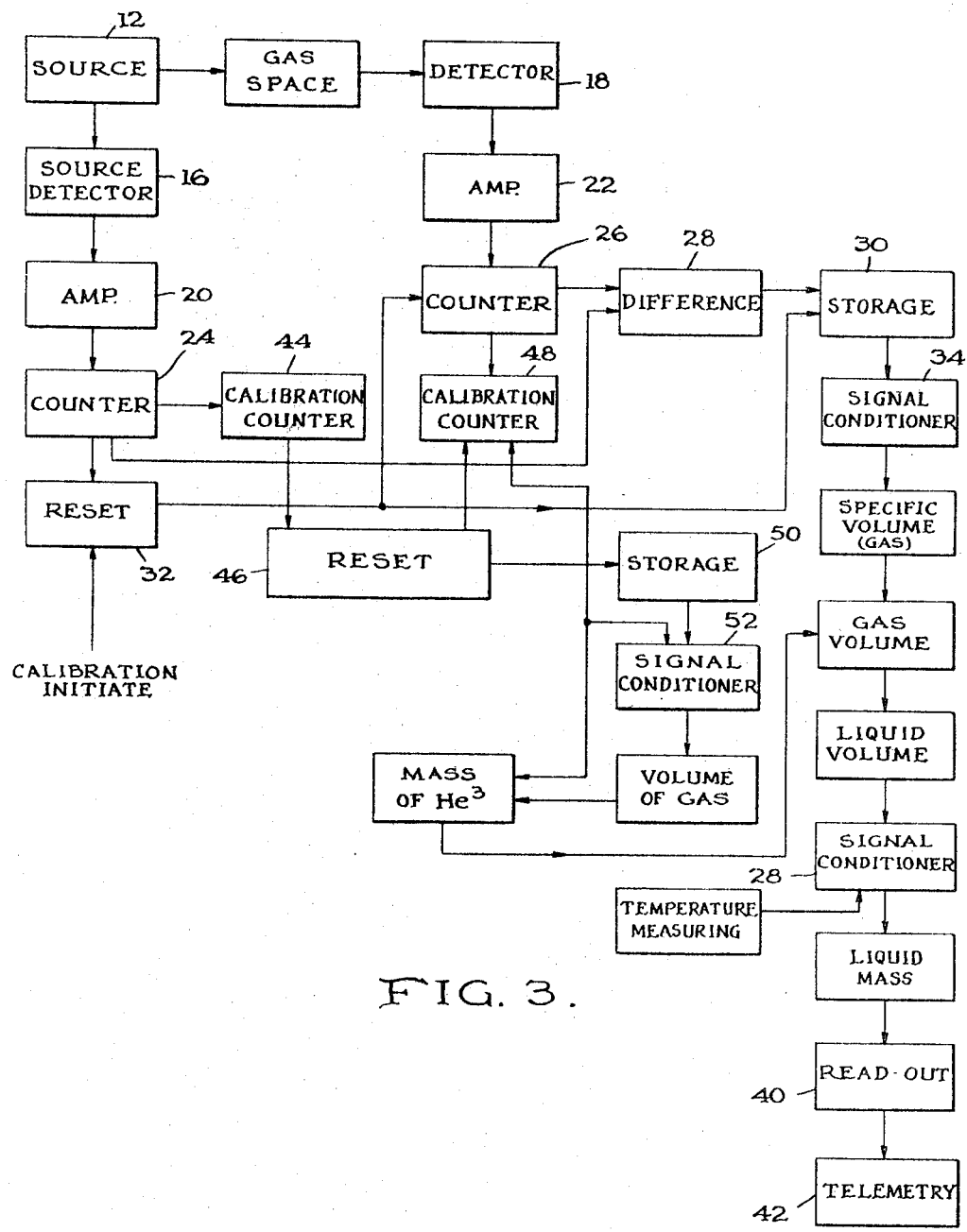
FIG. 3 is a schematic diagram illustrating the computation system for the detector device according to the invention.

Referring now to FIG. 1, a propellant tank 2 having a simple, continuous shape such as a sphere as shown is provided with the usual propellant outlet port 4. Opposed to the outlet port are located two high pressure trace gas containers 6 thermally sealed and being equipped with squib type valves 8 for the use of the gas contained therein. Each of the high pressure containers 6 is filled with accurately pre-measured charges of $Helium^3$. One of these trace gas charges is introduced into the main tank 2 after the initial filling operation and the other is then used as a means of maintaining signal strength as fuel is depleted and for recalibrating the detector at any time during the mission. A trace gas detector 10 is shown located at a point also opposite the tank outlet, this insures exposure to the vapor space during engine thrust conditions. However a vortex generator system located immediately above the detector assembly will insure that the vapor bubble or ullage space will envelop the detector at all times in either zero or low gravity conditions. A magnetic coupling is used to drive the vortex generator system which forms no part of this invention and is described and claimed in applicant's co-pending application Ser. No. 474,077, filed July 22, 1965.

The essential parts of the detector element 10 are shown in FIG. 2 and comprise generally a neutron source 12, a moderator 14 to deaccelerate high-energy neutrons and provide a neutron flux which is substantially thermal and two neutron counters 16, 18 one functioning as a source detector and the other as an absorption detector. It has been found that there are two alternatives in the selection of a neutron source for an application of this type, a $(\gamma, n)$ source producing low energy neutrons requiring little moderation to thermalize can be used or a $(\alpha, n)$ source producing high-energy neutrons requiring a larger moderator volume to thermalize. Considering the wide range of parameters including available neutron yield, its desired energy state, shielding, moderation, source decay time, availability, cost, size, weight, and heat produced, two neutron sources were found to be compatible with the detecting system according to this invention. One is a Po-Be, $\alpha$, $n$ and the other is a $\gamma$, $n$ source employing $Sb^{124}$-Be. The former has a half life of 148 days as compared to 60 days for the latter. For the purposes of this disclosure, however, reference will be made to a neutron source employing $Sb^{124}$-Be.

The neutron detectors themselves comprise an annular arrangement of Helium³ capsules 18 as best shown in FIG. 2. Because of the uniquely high neutron cross section of Helium³ the reaction between Helium³ and the neutron produces ionizing radiation which can be detected by a proportional counter as will be explained below. Thus the density of the trace gas for Helium³ is selectively measurable in the presence of Helium⁴, hydrogen, fluorine, and a wide range of other substances. As shown in FIG. 2, the gas detector element has a central portion of the gas detector comprising a neutron source 12, of a given quantity of $SB^{124}$ (antimony) which is surrounded by a given quantity of beryllium. Surrounding the beryllium is the moderator material 14, such as ice enclosed in a suitable container. Spaced from the neutron source material is an annular shielding ring 15 containing the detectors 18 as above described.

In operation, the propellant quantity measurement system as above described measures the ullage gas volume in the tank by measuring the density of a known amount of trace gas in the ullage volume. This volume is subtracted from total tank volume giving liquid volume. Liquid volume is converted to liquid mass based on the temperature of the liquid. The following series of equations express the relationships.

(1) $M = K_T V_L$
(2) $V_L = V_T - V_G$
(3) $$V_G = \frac{M_H}{\rho_H}$$
(4) $$\rho H = \frac{\log_e \frac{N_o}{N}}{\sigma x} = \frac{1}{\sigma x}(\log_e N_o - \log_e N)$$

Combining (1) (2) (3) and (4)

(5) $$M = K_T \left( V_T - \frac{M_H \sigma x}{(\log_e N_o - \log_e N)} \right)$$

where

M = Mass of liquid
$K_T$ = Temperature coefficient
$V_L$ = Volume of liquid
$V_T$ = Volume of tank
$V_G$ = Volume of gas
$M_H$ = Mass of Helium³
$\rho H$ = Density of Helium³
$N_o$ = Proportional to incident neutrons
$N$ = Proportional to transmitted neutrons
$\sigma$ = Cross-section of reaction
$x$ = Absorber length According to the schematic diagram in FIG. 3, the source 12 produces neutrons which pass through the gas space and enter the detectors 18. The output count will be reduced by the number of neutrons absorbed by the Helium³ in the gas space. The output of the source is also detected by the source detector 16. Detector 16 produces an output count proportional to source activity and is not dependent on any absorption. Amplifiers 20 and 22 amplify and shape the signal to drive the counters 24 and 26. The difference in output of counters 24 and 26 is computed in the difference device 28. This output represents the count of neutrons absorbed. The result is stored in a suitable storage unit 30 to provide a steady signal for output conversion while a reset signal from reset unit 32 resets the counters and storage. The first conversion is from neutrons absorbed to specific volume of the Helium³ which is accomplished in a signal conditioner 34 and produces the specific volume. Based on information on the mass of Helium³ in the tank specific volume is converted into total Helium³ which is also total gas volume. Simple subtraction from the total tank volume gives liquid volume. The output of a temperature sensor 36 combines with the liquid volume in a suitable signal conditioner 38 to produce liquid mass. The liquid mass signal is then converted to read-out display 40 and to a source of telemetry data 42. The components 44 through 52 are used to calibrate the mass of Helium³ when an additional charge of Helium³ is added to the tank and will be discussed in detail below. Counters 44 through 48 extend the range of counters 24, 26 respectively. This results in a longer count which provides a high accuracy count suitable for calibration. Reset unit 46 resets the counters and storage for calibration. A calibration initiate signal introduced into reset unit 32 permits the longer count to be taken. From the total count the new density is known. From volume and density the mass of helium can be determined and this is used for the remainder of the mission or until a new calibration is made. Since the generation of neutrons and their absorption by the Helium³ gas is a random process, only statistically correct answers can be obtained. By allowing the process to continue in time, an answer can be obtained with an arbitrarily high level of confidence.

The total amount of trace gas required depends on the minimum absorption required when the tank is empty. At this point the tank gas will have reached a minimum density. Equation 4 above gives the relationship between density and transmitted neutrons.

Measurement of the liquid temperature can be readily accomplished because the temperature excursion is small being roughly 10° K. for both hydrogen and fluorine liquids and the density versus temperature curves for these liquids are both fairly linear requiring only modest non-linearization techniques. Utilizing a suitable cryogenic temperature transducer 36, the temperature can be readily measured to ±0.1 C.

The gauging system according to this invention is designed to have the capability of in-flight recalibration by adding an additional charge of Helium³. This can be done automatically (i.e., to occur at a certain quantity of fuel remaining) or to occur at the command from an external source such as a ground station. The recalibration is accomplished by injecting a known quantity of Helium³ without any prior knowledge of the quantity of liquid in the tank 2 prior to the Helium³ injection. For example, this may be shown in the following manner:

Let $N_1$ = Transmission count prior to He³ injection
$N_2$ = Transmission count after He³ injection
$\sigma$ = Neutron cross section
$\rho$ = Number of He³ atoms/volume
$N_0$ = Reference count
$1$ = Path length (6) $N_1 = N_0 e^{-\rho_1 \sigma 1}$
(7) $N_2 = N_0 e^{-\rho_2 \sigma 1}$
(8) $N_1/N_2 = e^{(-\rho_1 + \rho_2)\sigma 1}$
(9) $$\log_e \frac{N_1}{N_2} = (\rho_2 - \rho_1)\sigma 1 = K_1(\rho_2 - \rho_1)$$

But $$\rho = \frac{\text{number of He}^3 \text{ atoms}}{\text{volume occupied by He}^3 \text{ atoms}}$$

Where $M_1$=Total number of He³ atoms prior to injection
$M_2$=Total number of He³ atoms after injection

(10)
$$K \log_e \frac{N_1}{N_2} = \frac{M_2 - M_1}{V}$$

$M_2 - M_1$ is injected quantity of He³. This assumes that the liquid volume does not change during the recalibration cycle.

(11)
$$V = \frac{M_2 - M_1}{K \log_e \frac{N_1}{N_2}}$$

Knowing the volume of gas at the count prior to He³ injection, one may readily calculate the quantity of the He³ in the tank prior to injection. Thus one can arrive at the final quantity of He³ in the tank, even assuming that the initial quantity of He³ was unknown. Thus, if it was suspected that a leakage or improper venting action had occurred, a recalibration cycle could be initiated and a new gaging procedure started.

The operation of the recalibration cycle is as follows: The calibration initiates cycle lengthens the read out time. Similarly, a precision count may be stored prior to the injection of the Helium³ charge. The duration of the "long count" is proportional to the absorption count of the Helium³. This in turn is a function of the source rate and the design of the detector assembly. At the end of this long count, the difference is read out of reset unit 46 and stored in storage unit 50 for comparison with the next reading. A pause of a given amount of time between readings of Helium³ density will allow diffusion of the Helium³ charge. At the conclusion of this pause, another long count is begun and fed into the reset counter 46. At the end of this second count the outputs of unit 46 and unit 50 are fed into the signal conditioner 52 which manipulates these two counts in accordance with the mathematics above (Equations 6–11) to arrive at a new quantity of Helium³ as mass of Helium³ in the tank. This new mass quantity is then stored for use in the normal read out system.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

That which is claimed is:

1. In a fuel gauging system for measuring a cryogenic propellant mass in a fuel tank the combination comprising; means for supplying a predetermined amount of a trace gas composed of Helium³ to said tank, means in said tank for supplying a source of thermal neutrons, and neutron absorption detection means located in said tank for measuring the absorption of thermal neutrons in said trace gas, and means responsive to said detection means for providing a signal representing the density of said Helium³.

2. In a fuel gauging system for measuring the quantity of a cryogenic propellant in a fuel tank the combination comprising; means for supplying a predetermined amount of a trace gas of Helium³ to said tank, means in said tank for applying a source of thermal neutrons, neutron absorption detection means located in said tank for measuring the absorption of thermal neutrons in said trace gas, signal conditioning means responsive to said detection means for providing an analogue signal representing the density of said Helium³, whereby said density measurement is an indication of the mass of propellant in said tank.

3. In a fuel gauging system for measuring the mass of a cryogenic propellant in a tank the combination comprising; means for supplying a predetermined amount of a trace gas of Helium³ to said tank, means in said tank for supplying a source of thermal neutrons, neutron absorption detection means located in said tank for measuring the absorption of thermal neutrons in said trace gas, signal conditioning means responsive to said detection means for providing an analogue signal representing the volume of said Helium³ in said tank, temperature sensing means in said tank for providing a signal responsive to the temperature of said propellant to said signal conditioner means for converting said signal representing trace gas volume to propellant mass.

References Cited

UNITED STATES PATENTS

| | | | |
|---|---|---|---|
| 2,873,377 | 2/1959 | McKay | 250—83.1 X |
| 2,979,618 | 4/1961 | Rickard | 250—83.1 |
| 3,069,545 | 12/1962 | Lide et al. | 250—83.1 |
| 3,238,370 | 3/1966 | Leeds | 250—83.1 |

ARCHIE R. BORCHELT, Primary Examiner

U.S. Cl. X.R.

250—83.1